Jan. 12, 1971  J. BEERY  3,555,395
MULTIPLE VOLTAGE BATTERY REGULATED POWER SUPPLY
Filed Sept. 9, 1968
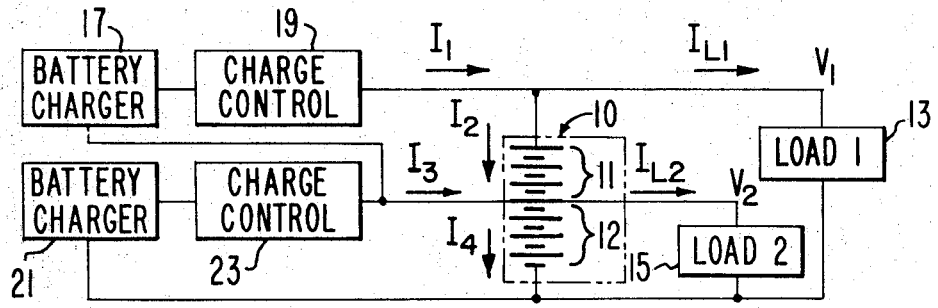
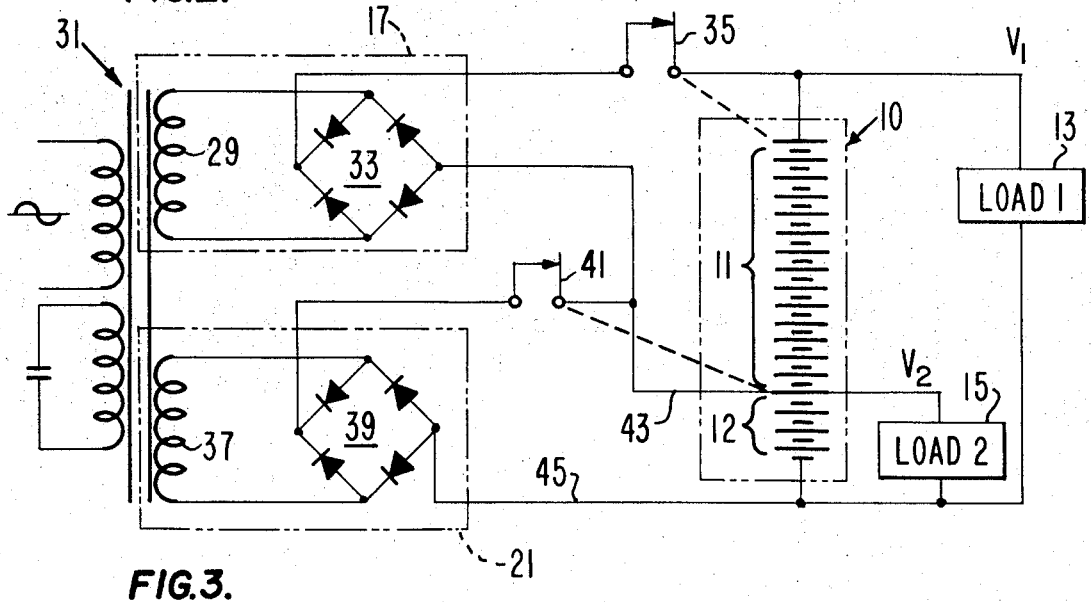
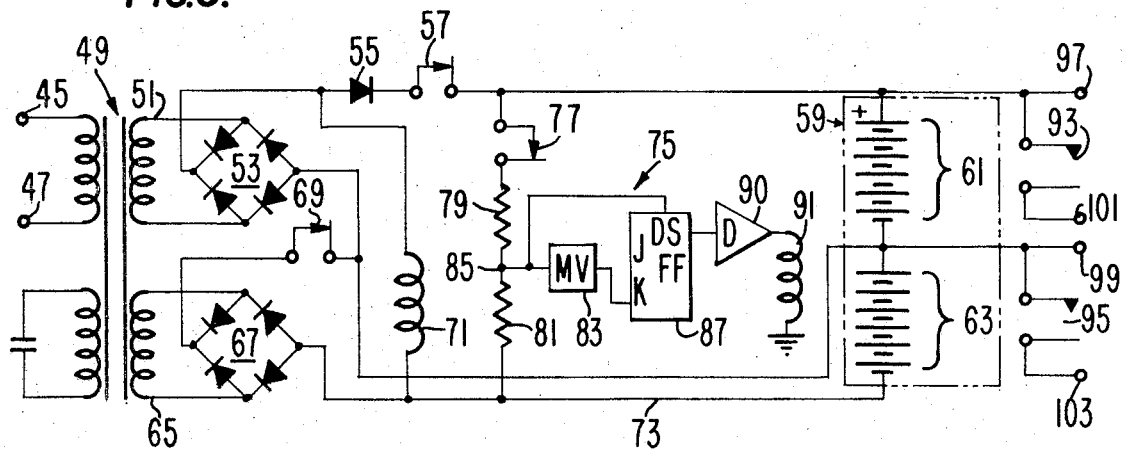
INVENTOR.
JACK BEERY.
BY
*Russel C. Wells*
ATTORNEY.

United States Patent Office 3,555,395
Patented Jan. 12, 1971

3,555,395
MULTIPLE VOLTAGE BATTERY REGULATED POWER SUPPLY
Jack Beery, Farmington, Mich., assignor to Burroughs Corporation, Detroit, Mich., a corporation of Michigan
Filed Sept. 9, 1968, Ser. No. 758,555
Int. Cl. H02j 7/04
U.S. Cl. 320—46                                                                                     3 Claims

ABSTRACT OF THE DISCLOSURE

A power supply system utilizing a battery having one or more voltage sections comprising a plurality of rechargeable cells which are used to regulate the voltage output of the supply. A battery charger is electrically connected by a charge control member between the battery and a source of A.C. power to provide both charging current to the battery and output current to the load. The charge control member is operatively connected to the battery to sense the degree of charge within the battery. Each voltage section of the battery is connected by a separate charge control member to separate chargers thereby controlling the recharging of each section of the battery according to its own charge requirement.

BACKGROUND OF THE INVENTION

Prior art battery supply systems using rechargeable cells require that either the electrical load on the system be constant or that the duty cycle of the system be small. If the load is constant, the cells may then be connected to a charging unit which is adjusted to supply a constant charge current. Such systems may use rheostats in series between the battery and the charge to supply a fixed amount of "trickle" current which will not overcharge the battery.

Systems which must supply a variable electrical load cannot rely on the constant current charge system because the output drain may or may not exceed the capacity of batteries in any given period of time. If the charge current was adjusted to compensate for the high output requirements, the batteries may become overcharged and damaged; likewise, if the charge current was adjusted to compensate for the average output requirements, the system may fail at the peak requirements.

In the development of business machines, it has become necessary to use dynamic MOS memories to provide large capacity computing capabilities within reasonable boundaries of cost. Dynamic memories, as their name implies, must be continuously pulsed if the information contained therein is to be retained. Momentary loss of electrical power may result in the loss of the information contained in such memories. Such momentary power loss may be initiated by such occurrences which may be defined as "an act of God" or the inadvertent removal of a line cord from a wall socket. When such power loss occurs, it is necessary that stand-by power be immediately supplied to the machine without any interruption in the power being supplied to the memories.

SUMMARY OF THE INVENTION

It is a principal object of the invention herein to provide a rechargeable battery-operated power supply wherein the battery charger is capable of supplying both output load current and battery charging current simultaneously.

It is another object of the invention to provide a power supply which will continuously supply output power to an electrical load in the event of any interruption in the A.C. power to the power supply.

The invention herein comprises a battery charger connected between a source of A.C. power and a battery pack. A charge control member or regulator is operatively connected to the battery pack electrically connecting the battery charger thereto in response to the degree of charge within the battery. The battery regulates the output voltage of the power supply and provides the peak current requirements of the electrical load. The charger is operable to supply both the battery charging current and the average current requirements of the electrical load.

DESCRIPTION OF THE DRAWINGS

In the drawings:
FIG. 1 is a block diagram of the power supply according to my invention;
FIG. 2 is a schematic diagram of the power supply of FIG. 1;
FIG. 3 is a schematic diagram of the preferred embodiment of a supply according to my invention.

DETAILED DESCRIPTION

Referring to FIG. 1 there is shown a block diagrammatic representation of a power supply comprising a battery pack 10 having two voltage sections 11 and 12 for supplying power to a first load 13 at a voltage $V_1$ and to a second load 15 at a voltage $V_2$. A battery charger 17 and charge control member 19 are electrically connected to supply the load current, $I_{L1}$ to the first variable load 13 and charge current $I_2$ to the battery 10. A second charger 21 and its associated charge control member 23 are electrically connected to supply the load current $I_{L2}$ to the second vaiable load 15 and charge current $I_4$ to the battery 10.

The battery pack 10 is comprised of a plurality of rechargeable voltage cells connected in series. In the preferred embodiment, each cell is a nickel cadmium cell having a voltage potential of approximately 1.4 volts. Each cell is of sintered plate construction for reducing the internal resistance of the cell thereby retaining the ripple voltage of the supply as low as possible.

The battery pack 10 is capable of providing two output voltages $V_1$ and $V_2$. Voltage $V_1$ is equivalent to the summation of all of the individual cells of sections 11 and 12 in the battery pack 10. Voltage $V_2$ is equal to the output voltage of section 12 and is a voltage somewhat less than the voltage $V_1$. In the preferred embodiment the total battery pack comprises eighteen cells with $V_1$ equal to approximately twenty-five volts and $V_2$, which is the output voltage of four cells, is equal to approximately five volts.

In FIG. 1, $I_1$ is shown as the current output of the battery charger 17 and is equivalent to the summation of the current for load 13, $I_{L1}$, and the charge current $I_2$ required by the battery pack 10, $I_3$ is the current output of the battery charger 21 and is equivalent to the summation of the current for load 15, $I_{L2}$, and the charge current $I_4$ as required by the battery pack 10. The charge currents $I_2$ and $I_4$ are supplied to the battery from the battery chargers in response to charge control member 19 and 23 respectively, which respond to the gas pressure within the cells of each battery section 11 and 12.

In FIG. 2 battery pack 10 is comprised of sections 11 and 12 which are electrically connected together. In the preferred embodiment section 12 is comprised of four cells and delivers an output voltage of $V_2$ equal to approximately five volts. Section 11 is comprised of an additional 14 cells and when combined with section 12 delivers a maximum output voltage $V_1$ of the battery pack 10 which in the preferred embodiment $V_1$ is twenty-five volts. The battery charger 17 comprises the secondary winding 29 of the constant voltage transformer 31 and the full wave rectifier circuit 33. The charge control 19 is represented schematically by a pressure switch 35 which is operatively connected to the output cell of section 11 of the battery. The battery charger 21 is comprised of another secondary winding 37 and its associated full wave rectifier 39. The charge control member 23 is schematically represented by a pressure switch 41 which is operatively connected to the output cell of battery section 12. The pressure switches 35 and 41 are responsive to the oxygen gas build-up within the battery. When a battery is fully charged, the pressure therein due to the oxygen build-up is high and; conversely, when the charge of a battery is low, the pressure is low.

The pressure switch 35 functions to operatively connect the charger section 17 to the battery section 11 when the charge in that section is below a predetermined pressure level. As shown in FIG. 2 the return path for battery charger 17 is from the terminal point of section 11 and 12 via line 43 to the return side of the bridge 33.

The pressure switch 41 functions in a similar manner as switch 35 to operatively connect the charger section 21 to the battery section 12 when the charge in that section is below a predetermined pressure level. When the pressure switch 41 is actuated, the battery section 12 draws the charge current $I_4$ as indicated in FIG. 1. As shown in FIG. 2 the return path for battery charger 21 is from the terminal end of section 12 via line 45 to the return side of the bridge 39.

As shown in FIG. 2, each battery charger 17 and 21 is independently connected to the battery pack 10. If the output current requirement of section 12 of the battery pack is such as to reduce the charge level therein below a predetermined level, the pressure switch 41 will connect the charger 21 to that section. While section 12 is charging, section 11 may well be discharging through load 13. The charge current is applied to the cells only when required. Thus, if the load on the batteries is reduced to zero, the charge currents $I_2$ and $I_4$ are reduced to zero and the battery sections 11 and 12 will not become overcharged.

In FIG. 3, there is schematically shown a complete power supply which will continuously supply output power to selected sections such as memory devices of a business machine in the event of the interruption of A.C. power as well as supply all the power requirements to a variable load under normal conditions. An A.C. line is connected by the terminals 45 and 47 of the primary winding of the transformer 49. Secondary winding 51 and bridge 53 comprise a battery charger which is connected via diode 55 and pressure switch 57 to the positive terminal of the battery pack 59. Battery pack 59 is comprised of two sections 61 and 63. Another secondary winding 65 and its associated full wave bridge 67 is connected via pressure switch 69 to the battery section 63. A relay 71 is connected from the anode of the rectifier 55 to the return supply line 73 of the power supply. Connected between the pressure switch 57 and the positive terminal of the battery 59 is an auxiliary timing circuit 75. The timing circuit 75 is connected to the battery output voltage by the normally closed contacts 77 of the relay 71. A voltage divider network comprising resistors 79 and 81 are connected from the one side of contacts 77 to ground. A monostable multivibrator 83 is connected at the junction 85 of the two resistors. A JK flip flop 87 is connected via line 89 from its dominant set terminal to the junction 85 of the two resistors. Electrically connected to the "one" output of flip flop 87 through a driver circuit 90 is a relay 91. The output of the multivibrator 83 is connected to the K input of flip flop 87. Normally open contacts 93 and 95 of relay 91 provide control of selective outputs from the power supply.

The relay 71 is energized whenever A.C. power is applied to the transformer 49. When the relay is energized, contacts 71 are open and the voltage at the junction 85 of the two resistors 79 and 85 is zero or at ground potential. With zero volts applied to the DS input of the JK flip flop 87, the relay 91 is energized and contacts 93 and 95 are closed. When there is an interruption in the A.C. power, relay 71 is de-energized and the battery is connected through contact 77 to the voltage divider network. A positive voltage appears at the junction 85 and on the line 89 to trigger the multivibrator 83 and to enable the flip flop 87.

The time period of the multivibrator 83 is such as to enable the machine to complete an operation with full power being drawn from the battery 59. After the multivibrator times out, a positive signal is applied to the K input of the flip flop 87 thereby switching the "one" output low. Relay 91 becomes de-energized and contacts 93 and 95 open. In the preferred embodiment, only the memory circuits are connected to the output terminals 97 and 99 and all the remaining load circuits are connected to the output terminals 101 and 103. Thus, the contacts 93 and 95 interrupt the current flow to all but the memory circuits when there is an interruption in the A.C. power to the supply.

There has been illustrated and described a multiple voltage battery regulated power supply having a battery pack comprising a plurality of rechargeable cells, for regulating the output of the supply and to furnish the peak power requirement of the electrical load attached to the supply. A battery charger is coupled via charge control member to each voltage section of the battery to maintain the battery in a fully charged condition and also to supply the average power requirements of a variable electrical load attached to the supply. The cells are charged upon demand and the use of a "trickle" charge is not required.

What I claim is:

1. A regulated power supply for supplying direct current to a plurality of electrical loads, comprising:
    at least two rechargeable battery voltage cells connected in electrical series to regulate the voltages to the electrical loads,
    at least two charge control members each responsive to a predetermined decrease in the charge of one said cells and respectively electrically connected to said cells supplying current to an electrical load,
    a constant voltage transformer having at least two isolated secondary windings, and
    at least two full wave rectifier bridges electrically connected respectively between said secondary winding and said charge control member to provide pulsating direct current to one of said cells in response to activation of said charge control members and to simultaneously provide direct current to the electrical loads.

2. A regulated power supply for supplying direct current to a variable electrical load, comprising:
    a first rechargeable battery voltage cell electrically connected in a parallel circuit with a first electrical load,
    a first voltage cell charger,
    a first control member electrically connected in a series circuit with said first rechargeable battery voltage cell and said first voltage cell charger,
    said first control member operable to electrically connect said first voltage cell charger to said first rechargeable battery voltage cell and the first electrical load in response to a predetermined decrease in the charge of said first rechargeable battery voltage cell,
    a second rechargeable battery voltage cell electrically connected in parallel circuit with a second electrical load and in electrical series circuit with said electrical parallel circuit of said first rechargeable battery voltage cell and said first electrical load,
    a second voltage cell charger, and
        a second control member connected in electrical series circuit with said second voltage cell charger and said second rechargeable battery voltage cell,
    said second control member operable to electrically connect said second voltage cell charger to said second rechargeable battery voltage cell and to said second electrical load in response to a predetermined decrease in the charge of said second rechargeable battery voltage cell.

3. A battery regulated power supply comprising:

a first rechargeable battery voltage cell electrically connected in a first parallel circuit to a first electrical load, said cell capable of supplying load current to said load, a first cell control member operatively coupled to said first battery voltage cell and responsive to the degree of charge within said cell, a second rechargeable battery voltage cell electrically connected in a second parallel circuit to a second electrical load, said cell capable of supplying load current to said load, a second cell control member operatively coupled to said second battery voltage cell and responsive to the degree of charge within said cell, said first and second rechargeable battery voltage cells connected in electrical series, a cell charging member electrically coupled between a source of power and each of said cell control members, said cell charging member responsive to one of said cell control members to simultaneously supply load current to the parallel load of said cell and charge current to said cell, and a timing member responsive to the loss of the source of power and operable to electrically disconnect at least one of said electrical loads from said rechargeable battery voltage cells a predetermined time after the loss of said source of power and to maintain the flow of load current from said rechargeable battery voltage cells to the other of said electrical loads.

References Cited

UNITED STATES PATENTS

| | | | |
|---|---|---|---|
| 1,947,204 | 2/1934 | Hoxie | 320—6 |
| 2,453,960 | 11/1948 | Arvidsson | 320—15 |
| 2,957,117 | 10/1960 | La Puyade | 320—35 |
| 3,100,862 | 8/1963 | Collier | 320—46 |
| 3,328,663 | 6/1967 | Kagan | 320—17 |
| 3,453,518 | 7/1969 | Rose et al. | 307—66 |

FOREIGN PATENTS

| | | | |
|---|---|---|---|
| 710,477 | 5/1953 | Great Britain | 307—64 |

J. D. MILLER, Primary Examiner

J. M. GUNTHER, Assistant Examiner

U.S. Cl. X.R.

307—29, 86; 320—6, 14, 52